UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

1,405,491.         Specification of Letters Patent.         Patented Feb. 7, 1922.

No Drawing.        Application filed February 25, 1921. Serial No. 447,802.

*To all whom it may concern:*

Be it known that I, HANS T. CLARKE, a subject of the King of Great Britain, residing at Rochester, in the county of Monroe and State of New York, have invented certain new and useful Improvements in Cellulose-Ether Compositions, of which the following is a full, clear, and exact specification.

This invention relates to a cellulose ether composition containing ingredients which enable it to be suitably manipulated and utilized in the plastic and analogous arts, such, for example, as sheet or film manufacture and varnish manufacture.

One object of this invention is to produce a composition which may be made into permanently transparent, strong and flexible sheets of suitable thinness that are substantially waterproof, are unaffected by ordinary photographic fluids, and in general possess the desirable properties of a support for sensitive photographic coatings. Other objects will hereinafter appear.

I have discovered that such a composition can be prepared by compounding cellulose ethers of the kind indicated in U. S. Patent No. 1,188,376, Lilienfeld, June 20, 1916, with phenyl phthalate. The ingredients are combined by using a solvent common to both.

I may, for example, use ethyl cellulose of the kind that is substantially insoluble in water and does not shrink to an undesirable amount in the photographic manipulations. By way of illustration, I may add to 100 parts of such ethyl cellulose 300 to 800 (say 500) parts of a mixture of benzol and ethyl alcohol, or any equivalent volatile solvent, likewise from 1 to 50 (say 30) parts of ethyl phthalate. The ingredients are thoroughly mixed into a homogeneous composition. The substances are of the commercial grade, purified sufficiently to impart the necessary transparency and comparative freedom from color when employed in the manufacture of photographic film base.

I may vary the proportions considerably, in order that the compositions may differ in the rate of flowing. This may be desired for different uses. The dope or composition hereinabove mentioned may be flowed satisfactorily under the customary film manufacturing conditions. The volatile solvents evaporate from the flowed composition sufficiently to leave a product that is suitable for the usual purposes in this art. The phenyl phthalate has only very low volatility and, therefore, stays in the film in sufficient quantities to impart characteristic flexibility and other qualities to it.

Having thus described my invention, what I claim as new and desire to secure by Letters Patent is:

1. A composition of matter comprising a cellulose ether and phenyl phthalate.
2. A composition of matter comprising ethyl cellulose and phenyl phthalate.
3. A composition of matter comprising a cellulose ether, phenyl phthalate and a common solvent.
4. A composition of matter comprising ethyl cellulose, phenyl phthalate and a common solvent.
5. A composition of matter comprising ethyl cellulose, phenyl phthalate, benzol and ethyl alcohol.
6. A composition of matter comprising 100 parts of ethyl cellulose, 300 to 800 parts of a compound benzol and ethyl alcohol solvent and 1 to 50 parts of phenyl phthalate.
7. As an article of manufacture, a sheet of deposited or flowed cellulose ether containing phenyl phthalate.
8. As an article of manufacture, a sheet of deposited or flowed ethyl cellulose containing phenyl phthalate.

Signed at Rochester, New York, this 17th day of February, 1921.

HANS T. CLARKE.